United States Patent
Krebs et al.

(10) Patent No.: US 8,865,317 B2
(45) Date of Patent: Oct. 21, 2014

(54) DECORATIVE LAMINATE AND METHOD FOR MANUFACTURING SAME

(75) Inventors: Robert R. Krebs, Georgetown, TX (US); Bruce E. Young, Sr., Killeen, TX (US)

(73) Assignee: Wilsonart LLC, Temple, TX (US)

( * ) Notice: Subject to any disclaimer, the term of this patent is extended or adjusted under 35 U.S.C. 154(b) by 252 days.

(21) Appl. No.: 13/085,833

(22) Filed: Apr. 13, 2011

(65) Prior Publication Data

US 2012/0107608 A1    May 3, 2012

Related U.S. Application Data

(60) Provisional application No. 61/408,825, filed on Nov. 1, 2010.

(51) Int. Cl.
*B32B 23/04* (2006.01)

(52) U.S. Cl.
USPC ........ 428/532; 428/536; 428/537.5; 427/322; 427/324; 427/384

(58) Field of Classification Search
USPC ........ 428/532, 536, 537.5; 427/322, 324, 384
See application file for complete search history.

(56) References Cited

U.S. PATENT DOCUMENTS

| | | | |
|---|---|---|---|
| 3,551,405 A * | 12/1970 | Read | 530/507 |
| 4,193,814 A | 3/1980 | Shen | |
| 4,265,846 A | 5/1981 | Shen | |
| 4,433,126 A * | 2/1984 | Hsu et al. | 527/105 |
| 4,476,193 A * | 10/1984 | Seidel et al. | 428/531 |
| 4,627,951 A | 12/1986 | Shen | |
| 5,017,319 A | 5/1991 | Shen | |
| 6,589,460 B1 | 7/2003 | Shen | |
| 7,183,339 B2 | 2/2007 | Shen et al. | |

FOREIGN PATENT DOCUMENTS

EP    0020004    * 12/1980

* cited by examiner

*Primary Examiner* — Leszek Kiliman
(74) *Attorney, Agent, or Firm* — Welsh Flaxman & Gitler LLC

(57) ABSTRACT

A decorative laminate includes a decorative layer and a core layer. The decorative layer is composed of a resin impregnated decorative sheet. The core layer is composed of at least one resin impregnated sheet of core paper. The core paper is impregnated with a resin composed of phenol formaldehyde resin and wood molasses. In this manner, a substantial portion of the resin used to impregnate the core paper is replaced with wood molasses, which results in a reduction of the cost of manufacturing the decorative laminate. The decorative laminate is manufactured by preparing a resin impregnated decorative sheet and preparing at least one resin impregnated core sheet by impregnating a core sheet with a resin composition composed of phenol formaldehyde resin and wood molasses. The decorative sheet and the core sheet are then layered to form a laminate lay-up that is heated and pressed to consolidate and cure the laminate.

20 Claims, 3 Drawing Sheets

DECORATIVE LAMINATE AND METHOD FOR MANUFACTURING SAME

CROSS REFERENCE TO RELATED APPLICATIONS

This application claims the benefit of U.S. Provisional Patent Application Ser. No. 61/408,825, filed Nov. 1, 2010, entitled "DECORATIVE LAMINATE AND METHOD FOR MANUFACTURING SAME".

FIELD OF THE INVENTION

The invention relates to a high pressure decorative laminate and method for manufacturing same.

BACKGROUND

Decorative laminates are generally constructed from plural layers of synthetic resin impregnated paper sheets bonded under heat and pressure to form a unitary structure. With regard to the manufacture of high pressure laminates, the decorative laminate sheet assembly includes at least a core of one or more phenol formaldehyde resin impregnated sheets and a melamine impregnated decorative sheet. The decorative sheet may be further covered with a transparent melamine impregnated overlay layer.

The decorative sheet provides the laminate with an attractive appearance. The decorative sheet, and the overlay layer, dictate the surface characteristics of the decorative laminate. For example, the composition of the decorative sheet and overlay layer dictates the decorative laminate's resistance to chemical agents, heat, light, impact and abrasion.

Decorative sheets are commonly manufactured from high quality 60-205 grams/meter$^2$, pigment filled, alpha cellulose paper impregnated with a water alcohol or water solution of melamine-formaldehyde resin. The resin impregnated decorative sheets are subsequently dried, partially cured, and finally cut into sheets. The pigment filled, alpha cellulose paper of the decorative sheet, may include a solid color, a decorative design, or a roto-gravure reproduction of natural materials, such as, wood, marble, leather, abstract design, etc. The aesthetic characteristics of the cellulose paper are revealed as the laminate's decorative design upon completion of the manufacture of the decorative laminate.

The core, or base, functions to impart rigidity and impact resistance to the laminate. Prior to stacking, the paper sheets of the core are impregnated with a water alcohol or water solution of phenol formaldehyde resin, dried and partially cured in a hot oven. The cured laminate is then cut into predetermined shapes used to assemble the laminate layer. The core may, for example, include a plurality of sheets of 160 to 550 grams/meter$^2$ basis weight Kraft paper, impregnated with phenol formaldehyde resin, wherein the phenol formaldehyde resin is generally 25% to 35% of the final weight of the impregnated or coated core sheet. The Kraft paper is impregnated throughout and bonded with a substantially cured phenol formaldehyde resin which has been converted to a thermoset state during the initial laminating step.

Those skilled in the art will appreciate that the overlay paper is commonly impregnated with melamine resin and can be positioned over decorative paper for improving the wear characteristics of the laminate. It is also commonly appreciated overlays impregnated with melamine resin can be positioned over decorative paper that is not impregnated with resin.

Impregnation of the paper and drying of the impregnated paper may be affected by conventional treaters and dryers known to those skilled in the art. The resin content of the impregnated paper generally ranges from about 55% to about 65% by weight based on the weight of the impregnated decorative paper, while the resin content of the overlay paper is generally high, for example, 65% to 82%. Paper volatile levels are maintained at about 5%+−0.5%. A balance between flow levels and treated weight of the treated paper is maintained to assure proper abrasion levels without reducing crack and/or craze resistance. Treated paper is beta-staged by drying at 65-182° C. for about 20-300 seconds and stored flat in a conditioned storage area. It has a nominal shelf life of at least about 3 months at 70-75° F. and 40-50% relative humidity.

A solid substrate may be bonded to the laminate where additional rigidity is required. Substrates are generally composed of a pre-cured plastic laminate, such as glass fiber-reinforced thermoset polyester resin laminates and the like; a wood product, such as hardboard, wood waste or particle boards, plywood and the like; a mineral base board, such as, cement-asbestos board, SHEETROCK® (plaster wall board), plaster board, and the like; or a combination of substrates. The substrate is commonly applied to the phenol formaldehyde resin impregnated sheets making up the core only after the laminate lay-up is pressed and heated to form the final decorative laminate.

Decorative laminates are generally manufactured by stacking the resin impregnated core sheets, the decorative sheet and the overlay layer to form a laminate sheet assembly, or laminate lay-up. The laminate lay-up is placed between steel plates and subjected to temperatures in the range of about 121° C.-160° C., preferably 131° C., and pressure of about 56.24 kg/cm$^2$-112.48 kg/cm$^2$, preferably 85 kg/cm$^2$ for a time sufficient to consolidate the laminate and cure the resins (generally about 25 minutes to an hour). The pressure and heat force the resin in the paper sheets to flow, cure and consolidate the sheets into a unitary laminated mass referred to in the art as a high pressure decorative laminate. Finally, the formed decorative laminate is bonded to a reinforcing substrate, such as, plywood, hardboard, asbestos board, particle board or the like.

The melamine resin employed in both the decorative layer and the overlay melamine resin is clear and colorless when fully cured and has stain and wear characteristics that have made it the resin of choice for many commercially available laminates. Resistance to discoloration due to heat and light is also realized.

The above discussion generally relates to high pressure laminates. Where a less expensive, less durable laminate is required, low pressure laminates may be used by fabricators. Low pressure laminates are generally composed of only the decorative and overlay layers. As with high pressure laminates, low pressure laminates are bonded to a substrate for added structural rigidity at the time of manufacture. The removal of the core results in a laminate which is less expensive to manufacture, but does not offer the strength and durability of high pressure laminates.

The resins employed in the manufacture of conventional decorative laminates are relatively expensive and rely upon petroleum products. As such, manufacturers are continually looking for manufacturing methods that allow for the manufacture of decorative laminates in a more cost effective, environmentally friendly manner.

SUMMARY

In one embodiment, the decorative laminate of the present disclosure includes a decorative layer and a core layer. The decorative layer is composed of a resin impregnated decorative sheet. The core layer is composed of at least one resin impregnated sheet of core paper. The core paper is impregnated with a resin composed of phenol formaldehyde resin and wood molasses. In one embodiment, the resin is composed of 60% by weight phenol formaldehyde and 40% by weight molasses. In this manner, a substantial portion of the resin used to impregnate the core paper is replaced with wood molasses, which results in a reduction of the cost of manufacturing the decorative laminate.

In one embodiment, the decorative laminate is manufactured by preparing a resin impregnated decorative sheet and preparing at least one resin impregnated core sheet by impregnating a core sheet with a resin composition composed of phenol formaldehyde resin and wood molasses. The resin impregnated decorative sheet and the at least one resin impregnated core sheet are layered to form a laminate lay-up. The laminate lay-up is then heated and pressed to consolidate and cure the laminate. In one embodiment, the resin is composed of 90% by weight phenol formaldehyde and 10% by weight molasses.

It is, therefore, an advantage of the present disclosure to provide a decorative laminate which has a reduced cost of manufacture.

Another advantage of the present disclosure is to provide a decorative laminate and method of manufacturing same which involves the use of more environmentally friendly materials.

DETAILED DESCRIPTION

Figure 1:
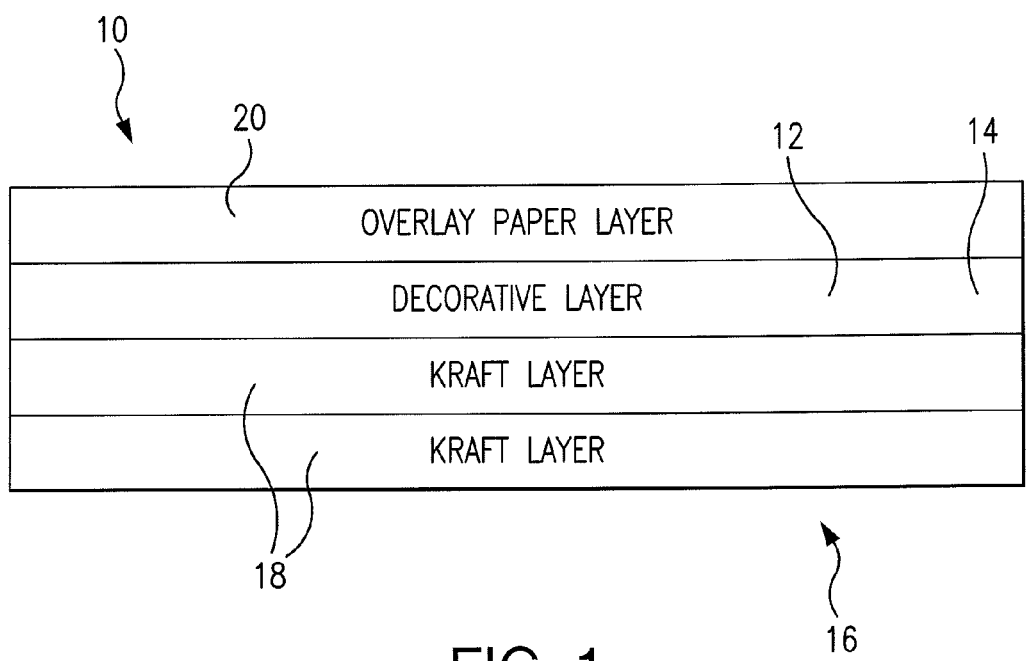
FIG. 1 is a schematic of the decorative laminate in accordance with one embodiment of the present disclosure.
Figure 2:
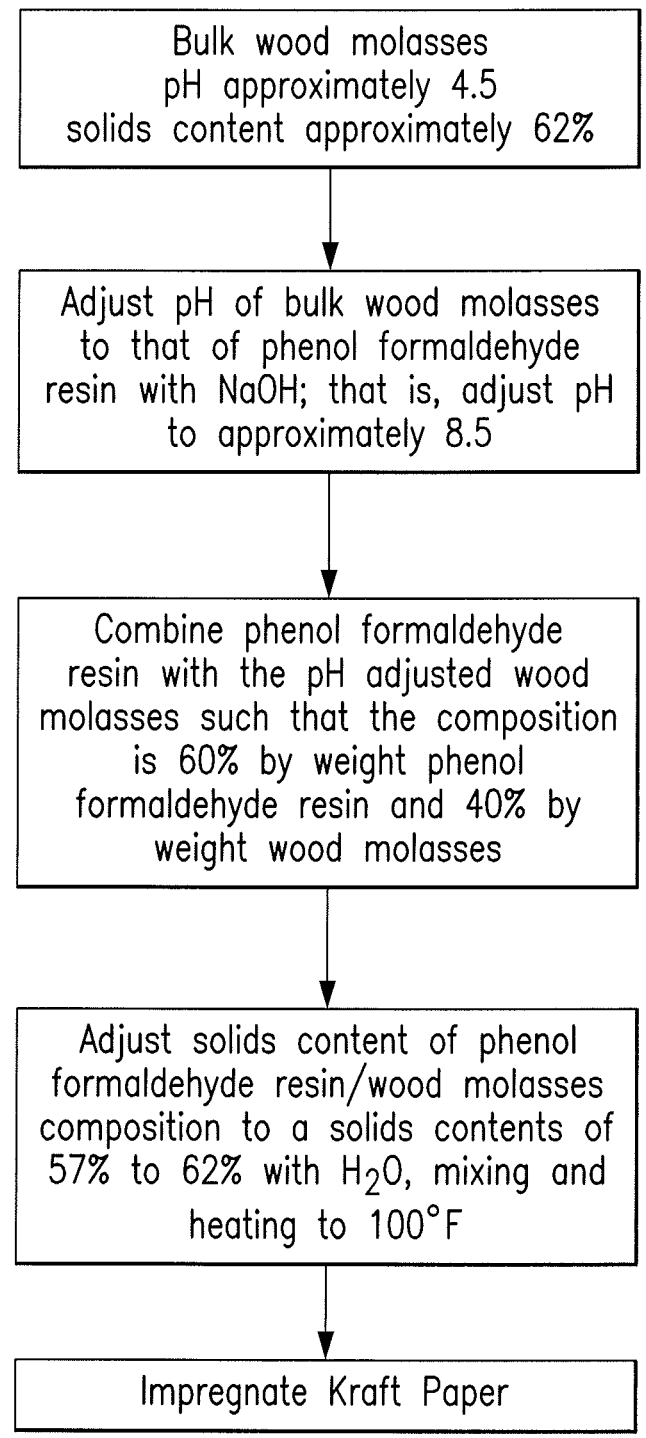
FIG. 2 is a flow chart describing an example process for preparing the resin composition.

Referring now to the drawings, an embodiment of the high pressure decorative laminate disclosed herein is illustrated in FIG. 1. It should be appreciated that the illustrated embodiment is merely an example. Therefore, the details disclosed herein are not to be interpreted as limiting, but merely as a basis for teaching one skilled in the art how to make and/or use the decorative laminate of the present disclosure.

Briefly, and as will be described in greater detail below, the decorative laminate 10 includes a decorative layer 12 and a core layer 16. The decorative layer 12 is composed of a resin impregnated decorative sheet 14. The core layer 16 is composed of at least one resin impregnated sheet of core paper 18 (sometimes referred to herein as "resin impregnated core sheet"), which is impregnated with a resin composed of phenol formaldehyde resin and wood molasses. The decorative laminate 10 is manufactured by preparing the resin impregnated decorative sheet 14 and preparing at least one resin impregnated core sheet 18. Preparing the at least one resin impregnated core sheet 18 includes impregnating the core sheet with a resin composition composed of phenol formaldehyde resin and wood molasses. The resin impregnated decorative sheet 14 and resin impregnated core sheet 18 are layered to form a laminate lay-up and the laminate lay-up is heated and pressed to consolidate and cure the laminate 10.

In accordance with an embodiment of the present disclosure, the high pressure decorative laminate 10 includes an overlay paper layer 20, a decorative layer 12, and a phenol formaldehyde resin/wood molasses core layer 16. It should be appreciated, however, that the layering pattern may be varied, somewhat, without departing from the spirit of the present disclosure.

The overlay paper layer 20 is preferably a melamine impregnated paper layer. The overlay paper layer 20 is preferably manufactured from a low basis weight transparent sheet impregnated with resin, for example, melamine. The resin impregnated overlay paper layer 20 is subsequently dried, partially cured and finally cut into sheets. While the paper may exhibit opaque properties prior to heating and pressing, the overlay paper layer 20 in the final fabricated laminate is preferably transparent to permit viewing of the decorative sheet 14 positioned directly beneath the overlay paper layer 20.

The decorative layer 12 is composed of a conventional decorative sheet 14 positioned directly beneath the overlay paper layer 20. When the laminate is fully heated and pressed, as will be discussed in detail below, the overlay paper layer 20 becomes translucent, fully exposing the decorative layer 12. The decorative layer 12 is chosen from a wide array of sheets. For example, the decorative layer 12 may be a solid color (for example, white) or may include an aesthetically appealing pattern.

The overlay paper layer 20 and the decorative layer 12 also dictate the surface characteristics of the final decorative laminate 10. For example, the composition of the overlay paper layer 20 and decorative layer 12 dictate the decorative laminate's resistance to chemical agents, heat, light, shock and abrasion.

As discussed above, the decorative layer 12 is composed of a sheet of decorative paper 14. The decorative sheets are commonly manufactured from high quality 60-205 grams/meter$^2$, pigment filled, alpha cellulose paper impregnated with a water alcohol or water solution of melamine-formaldehyde resin. The decorative paper 14, in accordance with an embodiment of the present disclosure, is impregnated with a resin content of approximately 50% or greater. The resin impregnated decorative sheets 14 are subsequently dried, partially cured, and finally cut into sheets. The pigment filled, alpha cellulose paper of the decorative sheet may include a solid color, a decorative design, or a roto-gravure reproduction of natural materials, such as, wood, marble, leather, etc. The aesthetic characteristics of the cellulose paper are revealed as the laminate's decorative design upon completion of the decorative laminate 10.

The core layer 16 is preferably composed of first and second resin impregnated sheets of Kraft (or core) paper 18 although other materials, and volume of sheets, may be used without departing from the spirit of the present disclosure. For example, the core layer 16 includes two sheets of 160-550 grams/meter$^2$ resin impregnated Kraft paper 18. The Kraft paper 18 is impregnated with a phenol formaldehyde resin/wood molasses composition and is partially cured (β-staged). Phenol formaldehyde resin/wood molasses composition saturation contents in the range of 25.0% to 50.0% have been used in accordance with the present disclosure. Phenol formaldehyde resin/wood molasses composition saturation contents in the range of 28.0% to 35.0% are, however, preferred to minimize migration of phenolic resin through the decorative paper 14 to the decorative surface.

In accordance with one embodiment, the phenol formaldehyde resin/wood molasses composition is approximately 60% by weight phenol formaldehyde resin and approximately 40% by weight wood molasses. Thus, a substantial portion of the phenol formaldehyde resin used in the impregnation of the Kraft paper 18 used in the manufacture of high pressure decorative laminate 10 is replaced with wood molasses.

Since phenol formaldehyde resin currently costs approximately $0.60 per wet pound while wood molasses costs approximately $0.06 per wet pound, replacing a substantial portion of the phenol formaldehyde resin with wood molasses in this manner provides for a reduction in the cost of manufacturing the high pressure decorative laminate. Additionally, this involves the use of more environmentally friendly materials. There are economic reasons for using as much wood molasses as possible. However, the viscosity of the wood molasses is much higher than the phenol formaldehyde resins, in particular, approximately 15 times higher, and it does not penetrate into the Kraft paper 18 as easily as the phenol formaldehyde resin. As such, and with the application of pressure impregnation systems as discussed below in greater detail, it has been found the phenol formaldehyde resin/wood molasses composition may have at least 5% by weight wood molasses to 40%, or greater, by weight wood molasses with the remainder phenol formaldehyde. Tests have indicated the practical upper limit is 50% by weight wood molasses. In view of the savings discussed above, most manufacturing will be done at the higher wood molasses level currently considered to be approximately 40%, while maintaining a high solids content, using currently available technology.

As those skilled in the art will appreciate, wood molasses is a bi-product of wood production processes. Generally, wood molasses (or hemicellulose extract) is a by-product of the manufacture of pressed wood products, such as fiberboard. Wood molasses is the concentrated soluble material obtained from treatment of wood at elevated temperature and pressure with the use of acids, alkalis or salts. Wood molasses is composed of both pentose (5 carbon) and hexose (6 carbon) sugars. It is a dark brown color, has a "woody" odor and is quite viscous particularly at low temperatures. It should be appreciated that wood molasses produced from any suitable methodology may be utilized in accordance with the present disclosure.

The final phenol formaldehyde resin/wood molasses composition is prepared by first receiving bulk wood molasses for utilization in the present process. The bulk wood molasses is preferably obtained from wood processing plants that manufacture the bulk wood molasses using conventional manufacturing techniques. The bulk wood molasses as received generally has a pH of approximately 4.5 and has approximately 62% solids.

In an embodiment, the pH of the bulk wood molasses is adjusted with the addition of sodium hydroxide (NaOH). The pH is adjusted to match the pH of the phenol formaldehyde resin used in the manufacture of the decorative laminate. That is, the pH of the wood molasses is raised to approximately 8.5 through the application of NaOH, thereby creating pH adjusted wood molasses. It should be appreciated that any suitable alkaline or base material (that is, a material having a pH greater than 7), for example, KOH or $Ca(OH)_2$, may be used without departing from the spirit of the present disclosure.

With the pH adjusted to match that of the phenol formaldehyde resin, the pH adjusted wood molasses is added to phenol formaldehyde resin such that the combined mixture includes 60% by weight phenol formaldehyde resin and 40% by weight molasses. It will be appreciated by those skilled in the art that phenol formaldehyde resin as commonly received has a solids content of 60% to 62%. The final solids content of the combined phenol formaldehyde resin/wood molasses composition, that is, the resin composition with which the Kraft paper is impregnated, is in the range of 57% to 62%. This solids content is achieved by adding water, mixing and heating the phenol formaldehyde resin/wood molasses composition to a temperature of 100° Fahrenheit (38° Celsius). It is appreciated phenol formaldehyde resin having a solids content higher than 60% to 62%, which would result in a higher solids content in the combined phenol formaldehyde resin/wood molasses composition, might be possible with the utilization of pressure impregnation systems as discussed below. The use of phenol formaldehyde resin with a higher solids content would result in a cost savings as phenol formaldehyde resin is normally diluted with methanol, a relatively high cost solvent. In addition, higher solids content results in a reduction in shipping costs as solvent is not being shipped from the resin supplier to the manufacturing plants; that is, more solids would go into each tanker truck.

The combined solution is then sent to the impregnation unit. As discussed above, the present process employs pressure impregnation techniques for incorporating the combined phenol formaldehyde resin/wood molasses composition into the Kraft paper. These pressure impregnation techniques allow for the user of phenol formaldehyde resin/wood molasses compositions having higher wood molasses levels. For example, the Vits Technology GmbH MIPLY pressure impregnation system or the Faustel pressure impregnation system may be employed in the pressure impregnation of Kraft paper with the phenol formaldehyde resin/wood molasses composition in a manner allowing for high levels of wood molasses to be employed.

Figure 3:
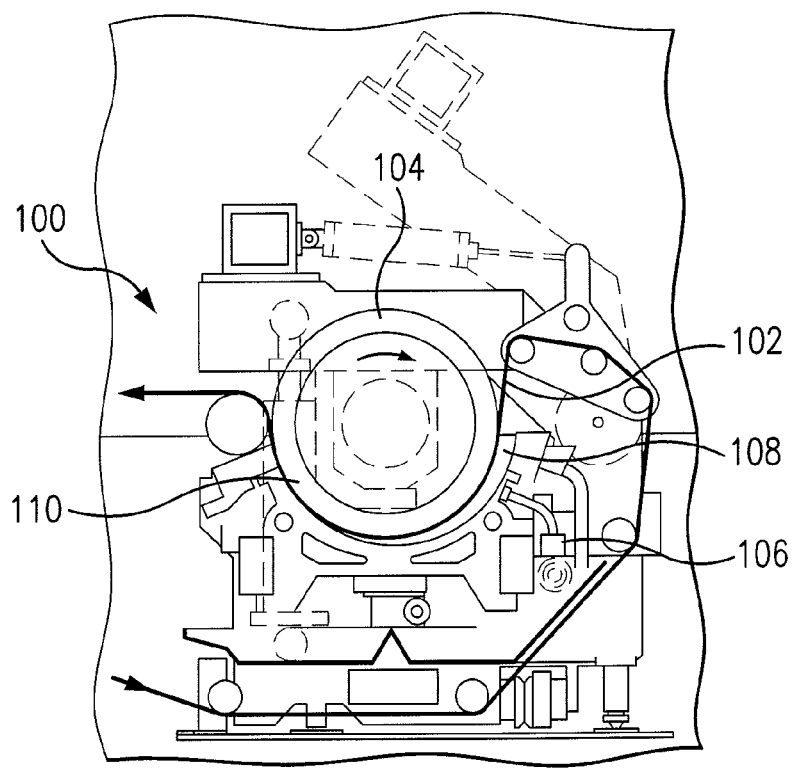
FIGS. 3 and 4 are schematics showing alternate pressure impregnation systems for use in the process disclosed in FIG. 2.

For example, and with reference to FIG. 3, the Vits Technology GmbH MIPLY pressure impregnation system 100 is well suited for impregnating webs of Kraft paper. Briefly, the paper web 102, that is, the Kraft paper, wraps about the rotating cylinder 104 of the pressure impregnation unit while a pump 106 supplies the impregnating medium into the pressure chamber 108. Hydrodynamic and hydrostatic pressure force the impregnating medium into the paper 102 from one side, squeezing the air out on the other side into the cylinder gravure 110.

Figure 4:
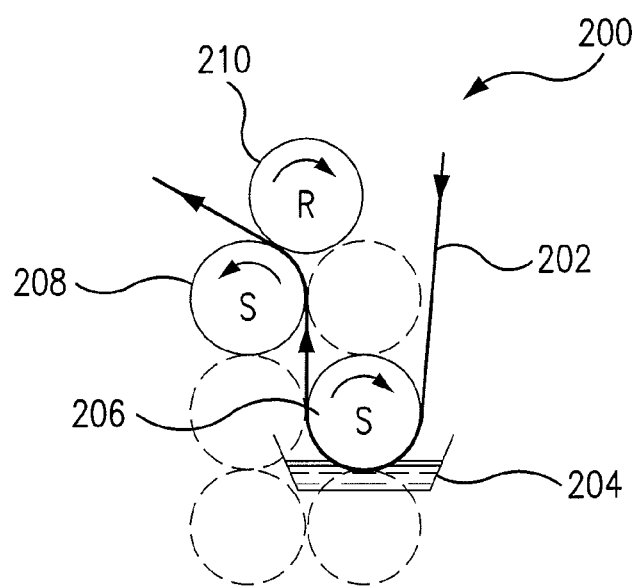

In addition, the Faustel pressue impregnation system has also been found effective in impregnating Kraft paper with the phenol formaldehyde resin/wood molasses composition. Referring to FIG. 4, the Faustel pressue impregnation system 200 passes a moving paper web 202 through a bath 204 of the phenol formaldehyde resin/wood molasses composition under the guidance of a first roller 206. Thereafter, the soaked paper web is subjected to squeezing pressure by passing the paper web 202 between second and third rollers 208, 210. The second and third rollers 208, 210 act as a nip and the space between is accurately controlled to maintain a set gap, wherein the gap is less than the thickness of the dry, unimpregnated Kraft paper. The second roller 208 is steel and the third roller 210 is made of a softer material, such as synthetic rubber. As such, the rubber of the third roller 210 actually deforms as the Kraft paper passes between the second and third rollers 208, 210.

Although pressure impregnation techniques are disclosed above in accordance with a preferred embodiment of the present invention, it is appreciated other impregnation methodologies may be employed. For example, a dip and scrape impregnation unit or an applicator roll and meyer rod may be employed in impregnating the Kraft paper with the phenol formaldehyde resin/wood molasses composition.

Once the appropriate layers of the laminate are formed, the sheets 14, 18, 20 are stacked in a conventional manner, and the laminate lay-up is heated and pressed. In accordance with an embodiment of the present disclosure, the layers are first stacked and placed between steel plates. The laminate stack is then subjected to temperatures in the range of 121° C.-160° C., preferably 131° C., and pressure of about 56.24 kg/cm$^2$-112.48 kg/cm$^2$, preferably 85 kg/cm$^2$ for a time sufficient to consolidate the laminate and cure the resins (generally about 25 minutes to an hour). The laminate is then cooled for approximately 10 minutes under pressure before it is ready for further processing in preparation for its use in the manufacture of various products.

While specific temperatures, pressures and times are described above, it should be appreciated that a variety of pressing techniques may be used without departing from the spirit of the present disclosure.

The pressure and heat force the resin in the paper sheets to flow, cure and consolidate the sheets into a unitary laminated mass referred to in the art as a decorative high pressure laminate. Generally, more than one laminate is formed at one time. Multiple laminates are formed by inserting a plurality of assembled sheets in a stack. Release sheets are positioned between the assembled sheets to separate the various laminates stacked together. After consolidation, the release sheets allow the individual laminates to be separated.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A decorative laminate, comprising:
   a decorative layer including a resin impregnated decorative sheet; and
   a core layer including at least one resin impregnated sheet of core paper, wherein the core paper is impregnated with a resin composed of phenol formaldehyde resin and wood molasses.

2. The decorative laminate of claim 1, wherein the core paper is impregnated with a resin composed of at least 5% by weight molasses.

3. The decorative laminate of claim 2, wherein the core paper is impregnated with a resin composed of 60% by weight phenol formaldehyde and 40% by weight molasses.

4. The decorative laminate of claim 2, wherein the core paper is Kraft paper.

5. The decorative laminate of claim 1, wherein the core paper is impregnated to a saturation content in a range of 25.0% to 50.0%.

6. The decorative laminate of claim 5, wherein the core paper is impregnated to a saturation content in a range of 28.0% to 35.0%.

7. The decorative laminate of claim 1, wherein the decorative sheet is impregnated with melamine resin.

8. The decorative laminate of claim 1, further including an overlay paper layer positioned over the decorative layer.

9. The decorative laminate of claim 1, wherein the core paper is Kraft paper.

10. The decorative laminate of claim 1, wherein the Kraft paper has a dry weight of 160-550 grams/meter$^2$.

11. The decorative laminate of claim 1, wherein the core paper is impregnated to a saturation content in a range of 25.0% to 50.0%.

12. The decorative laminate of claim 10, wherein the core paper is impregnated to a saturation content in a range of 28.0% to 35.0%.

13. A method of manufacturing decorative laminate, said method comprising:
    preparing a resin impregnated decorative sheet;
    preparing at least one resin impregnated core sheet by impregnating a core sheet with a resin composition composed of phenol formaldehyde resin and wood molasses;
    layering the resin impregnated decorative sheet and the at least one resin impregnated core sheet to form a laminate lay-up; and
    heating and pressing the laminate lay-up to consolidate and cure the laminate.

14. The method of claim 13, wherein the resin composition is composed of at least 5% by weight wood molasses.

15. The method of claim 13, which further includes preparing the resin composition by adding an alkaline material to the wood molasses until a pH of the wood molasses matches a pH of the phenol formaldehyde resin, thereby creating pH1 adjusted wood molasses, and incorporating the pH adjusted wood molasses into the phenol formaldehyde creating a phenol formaldehyde resin/wood molasses composition.

16. The method of claim 15, wherein the pH adjusted wood molasses has a pH of 8.5.

17. The method of claim 15, wherein the alkaline material is NaOH.

18. The method of claim 15, wherein the resin composition is composed of at least 5% by weight wood molasses.

19. The method of claim 15, wherein preparing the resin composition further includes adjusting the solid content of the phenol formaldehyde resin/wood molasses composition to a range of 57% to 62% to create the resin composition.

20. The method of claim 13, wherein the core paper is impregnated with a resin composed of 60% by weight phenol formaldehyde and 40% by weight molasses.

* * * * *